(12) United States Patent
Patel et al.

(10) Patent No.: US 10,405,261 B1
(45) Date of Patent: Sep. 3, 2019

(54) METHOD AND APPARATUS FOR WIRELESS INTERNET ACCESS

(71) Applicant: MBIT WIRELESS, INC., Irvine, CA (US)

(72) Inventors: Bhaskar Patel, San Clemente, CA (US); Arumugam Govindswamy, Irvine, CA (US)

(73) Assignee: MBIT WIRELESS, INC., Irvine, CA (US)

( * ) Notice: Subject to any disclaimer, the term of this patent is extended or adjusted under 35 U.S.C. 154(b) by 312 days.

(21) Appl. No.: 15/150,865

(22) Filed: May 10, 2016

(51) Int. Cl.
| | | |
|---|---|---|
| G08C 17/00 | (2006.01) | |
| H04W 48/08 | (2009.01) | |
| H04W 64/00 | (2009.01) | |
| H04L 12/26 | (2006.01) | |
| H04B 17/318 | (2015.01) | |
| H04W 84/04 | (2009.01) | |
| H04W 84/12 | (2009.01) | |
| H04W 88/06 | (2009.01) | |

(52) U.S. Cl.
CPC .......... *H04W 48/08* (2013.01); *H04B 17/318* (2015.01); *H04L 43/0811* (2013.01); *H04W 64/00* (2013.01); *H04W 84/042* (2013.01); *H04W 84/12* (2013.01); *H04W 88/06* (2013.01)

(58) Field of Classification Search
CPC ..... H04W 8/005; H04W 88/06; H04W 88/08; H04W 28/08; H04W 28/084; H04W 84/12; H04W 64/00; H04W 36/0061
USPC ....... 370/329, 338, 310, 328, 343, 311, 331, 370/411
See application file for complete search history.

(56) References Cited

U.S. PATENT DOCUMENTS

| | | | | |
|---|---|---|---|---|
| 2007/0140163 A1* | 6/2007 | Meier | .................. | H04W 8/005 370/329 |
| 2010/0093368 A1* | 4/2010 | Meyer | ..................... | G01S 5/021 455/456.1 |
| 2012/0294215 A1* | 11/2012 | Ekici | ..................... | H04W 48/18 370/311 |
| 2018/0324621 A1* | 11/2018 | Thangarasa | ........... | H04W 24/10 |

* cited by examiner

*Primary Examiner* — Phuongchau Ba Nguyen
(74) *Attorney, Agent, or Firm* — Lerner, David, Littenberg, Krumholz & Mentlik, LLP (57) ABSTRACT

Many new applications in a wireless client terminal rely on having internet connection available continuously to check the status and to do required download or upload of user data. The continuous internet connection increases power consumption of a client terminal and may also incurs additional costs due to internet usage fees. The power consumption, quality of service and cost of service from different networks such a Wireless Wide Area Networks (WWAN) and Wireless Local Area Network (WLAN) may be different. The coverage area of accessible WLANs may be quite limited compared to WWANs. A method and apparatus are disclosed that automatically enable and disable the WLAN access in a client terminal based on prevailing scenario and WLAN availability.

13 Claims, 7 Drawing Sheets

FIG. 1

(Prior Art)

METHOD AND APPARATUS FOR WIRELESS INTERNET ACCESS

BACKGROUND

Figure 1:
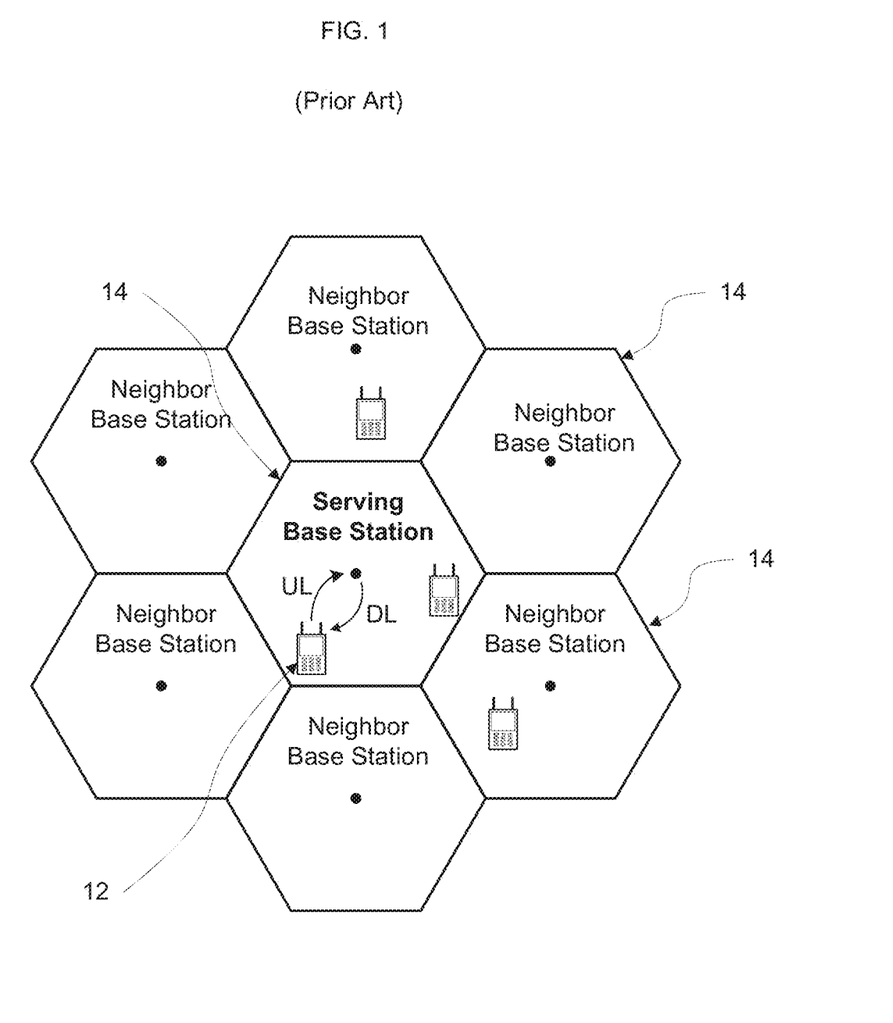
FIG. 1 illustrates a conventional Wireless Wide Area Network.

Typically, as shown in FIG. 1, a Wireless Wide Area Network (WWAN) comprises elements such as client terminals or User Equipment (UE) and one or more base stations. Other network devices may also be employed, such as a switching center (not shown). As illustrated in FIG. 1, the communication path from the base station (BS) to the client terminal or UE is referred to herein as a downlink (DL) direction or downlink channel, and the communication path from the client terminal or UE to the base station is referred to herein as an uplink (UL) direction or uplink channel. In some WWAN, the UE communicates with the BS in both the DL and UL directions. For instance, such communication is carried out in cellular telephone systems. In other WWAN, the client terminal or UE communicates with the base stations in only one direction, usually the DL. Such DL communication may occur in applications such as paging. As used herein, the terms "base station" and "network" are used interchangeably. The terms client terminal and UE are used interchangeably herein.

Many modern client terminals and networks offer a diverse set of services and applications in addition to voice services. Many of the new services and applications rely on an internet connection being available. The internet connection for these services and applications requires a client terminal to continually keep exchanging information with the WWAN to ensure that the internet connection is active and to check the status for various applications and services.

The coverage area of a Wireless Local Area Network (WLAN) may be limited, in the order of a few meters. The device that offers the WLAN service is referred herein as an Access Point (AP). A client terminal in a WLAN may typically transmit at lower power while communicating with WLAN when compared to the case of communicating with a WWAN. This reduces power consumption when accessing the internet through a WLAN compared to accessing internet through a WWAN. This may be an important consideration for battery operated client terminals.

For internet traffic load balancing purposes as well as to maintain Quality of Service (QoS), it may be desirable to have some client terminals switch from WWAN to WLAN and vice versa. The cost of internet service may be different for WWAN and WLAN. A WLAN based internet access may be available over a relatively small region whereas a WWAN based internet access may be available nationwide and across nations.

Considering the power consumption, load balancing, QoS, cost, availability, and possibly other factors, it may be desirable for a client terminal to switch between WWAN and WLAN. Considering all these factors, it may be preferred to get internet access from WWAN or WLAN depending on the specific scenarios.

When a user is, for example, at home or at the office, a WLAN may be accessible. The WLAN access is already paid for by subscribing to the internet service for the home or the office. This allows the user to access all the services and applications on a client terminal through the WLAN access and therefore it does not cost the user extra since the WWAN is not accessed for internet when at home or at the office.

When a user is outside WLAN coverage area, the client terminal may not have WLAN access and may be using WWAN. However, the client terminal may continue to search for WLAN access. This may lead to wasting battery power in a client terminal. For this reason, some users may turn off WLAN access on their client terminals. Therefore, even though WLAN access is usually available and already paid for at certain locations such as a home or office, it may be enabled or disabled by users on a need basis. This manual control of WLAN access may lead to inferior user experience. Furthermore, if a user forgets to disable the WLAN when going out of the current WLAN coverage area such as a home or office, the client terminal may waste power searching for a WLAN connection. Similarly, when a user returns to areas where it does have WLAN access and does not remember to enable WLAN access, the client terminal may continue to use the WWAN which may lead to increased power consumption, reduced QoS, possibly increased cost, etc.

SUMMARY

A method and apparatus are disclosed that automatically enable and disable the WLAN access on a client terminal based on the scenario of the user and preferred WLAN availability. The disclosed method enables reduced power consumption and improved user experience.

In accordance with an aspect of the present disclosure, a method for internet access at a client device in a wireless communication system may include controlling, by a processing device, when the client device is determined to be successfully connected to the internet via a Wireless Local Area Network (WLAN) identified by a new Basic Service Set Identifier (BSSID), storing in a memory of the client device an association of the new BSSID with a Base Station Identifier (BSID) identifying a Wireless Wide Area Network (WWAN) detected by the client device and a location of the client device at a time the client device is successfully connected to the internet via the WLAN identified by the new BSSID.

In one alternative, the BSID may indicate at least one identifier for a base station.

In one alternative, the wireless communication system may be a $3^{rd}$ Generation Partnership Project (3GPP) Long Term Evolution (LTE) wireless communication system, and the at least one identifier may indicate a Physical Cell Identity (PCI) or a Cell Global Identity.

In one alternative, the method may include controlling, by the processing device, when the client device is determined to be within a predetermined radius of a given location to which at least one given BSSID is associated previously by the processing device as indicated in the memory, automatically enabling WLAN access at the client device for any of the at least one given BSSID.

In one alternative, the method may include controlling, by the processing device, when the WWAN identified by the BSID is detected at the client device and a current location of the client device is determined to be within a predetermined radius of the location, enabling checking whether internet service is available for the WLAN identified by the new BSSID.

In one alternative, the processing device may determine the current location of the client device when the detected WWAN identified by the BSID is determined to be associated with a WLAN identified by a given BSSID as indicated in the memory.

In one alternative, the method may include controlling, by the processing device, whether WLAN access is enabled at the client device based on a determination of an association between at least one given BSID and at least one given BSSID as indicated in the memory.

In one alternative, the method may include controlling, by the processing device, when the client device is determined to move out of a coverage area of a WWAN identified by a given BSID to which a WLAN of a given BSSID is associated as indicated in the memory, and when a BSID identifying another WWAN to which the client device is moving is determined to be associated with at least one another BSSID as indicated in the memory, maintaining WLAN access enabled at the client device for a WLAN identified by the at least one another BSSID, and when the BSID identifying another WWAN to which the client device is moving is determined not to be associated with any BSSID as indicated in the memory, disabling WLAN access at the client device.

In one alternative, the method may include controlling, by the processing device, enablement of WLAN access at the client device for the WLAN identified by the at least one another BSSID, based on whether the WLAN identified by the least one another BSSID is determined to be accessible to a user of the client device.

In one alternative, the WLAN identified by the least one another BSSID may be determined not to be accessible to user of the client device, when the user of the client device is not authorized to access the WLAN identified by the least one another BSSID.

In one alternative, the method may include controlling, by the processing device, when the client device is determined to move out of a coverage area of the WLAN identified by the new BSSID, disabling WLAN access at the client device before a determination that a current location of the client device is out of a coverage area of the WWAN identified by the BSID associated with the new BSSID.

In one alternative, the determination that the current location of the client device is out of a coverage area of the WWAN identified by the BSID may use first location information having a greater location accuracy than second location information, where the second location information is based on the location of the client device at the time client device is successfully connected to the internet via the WLAN identified by the new BSSID as indicated in the memory.

In one alternative, the first location information may be determined based on at least one of Received Signal Strength Indicator (RSSI), Reference Signal Received Power (RSRP), Reference Signal Received Quality (RSRQ) or Timing Advance (TA).

In one alternative, the method may include controlling, by the processing device, when the client device is determined to move out of a coverage area of the WLAN identified by the new BSSID, determining whether to enable or disable WLAN access at the client device based on a base station reselection or a handover pattern.

In one alternative, the method may include controlling, by the processing device, when the client device is determined to be at a boundary of two WLANs, determining whether to enable and disable WLAN access at the client device using hysteresis.

In one alternative, the processing device may determine whether to enable and disable WLAN access at the client device using hysteresis, such that when the client device is in an enabled state for the WLAN access, the WLAN access for the client device is disabled according to a first timer duration, and when the client device is in an disabled state for the WLAN access, WLAN access for the client device is enabled according to a second timer duration different from the first timer duration.

In one alternative, the memory may indicate an association of the new BSSID with a plurality of given BSIDs.

In one alternative, the method may include controlling, by the processing device, determining whether to enable or disable WLAN access at the client device for a WLAN identified by a given BSSID indicated in the memory, based on a predetermined priority of at least one of power consumption, Quality of Service (QoS) or cost, wherein the predetermined priority is based on input from a user of the client device.

In one alternative, the association of the location of the client device and the WLAN identified by the new BSSID may be based on at least one of an association of the BSID to the new BSSID, an association of Global Positioning System (GPS) coordinates to the new BSSID, an association of the BSID to a Media Access Control (MAC) address for the WLAN identified by the new BSSID or an association of GPS coordinates to the MAC address for the WLAN identified by the new BSSID.

In one alternative, the memory may indicate, for a given BSID, an association of a given location of the client device with a plurality of given BSSIDs.

In one alternative, the method may include controlling, by the processing device, storing an association of a given new BSSID with a given BSID in the memory based on available space in the memory, such that, when the available space in the memory is less than space in the memory required for storing an entry indicating the association of the given new BSSID with the given BSID, replacing an oldest entry in the memory indicating an association of another BSSID with the given BSID with the entry indicating the association of the given new BSSID with the given BSID.

In one alternative, the association of the given new BSSID with the given BSID may be stored in the memory based on time stamp information stored with an entry in the memory indicating association of the given BSID with the another BSSID.

In one alternative, the memory may be a circular buffer, and the method may further include controlling, by the processing device, storing an association of the given new BSSID with the given BSID in the memory using circular buffering.

In one alternative, the method may include controlling, by the processing device, whether to enable or disable WLAN access for a WLAN identified by a given BSSID associated with a given BSID indicated in the memory, based on at least one of an adjustable Received Signal Strength Indicator (RSSI) threshold, an adjustable Reference Signal Received Power (RSRP) threshold, an adjustable Reference Signal Received Quality (RSRQ) threshold or an adjustable Timing Advance (TA) threshold for the given BSID.

In one alternative, the memory may include, for each BSID to which the given BSSID is associated, at least one of a given adjustable RSSI threshold, a given adjustable RSRP threshold, a given adjustable RSRP threshold or a given adjustable TA threshold for each given BSID associated with the given BSSID.

In one alternative, the method may include controlling, by the processing device, when the client device is determined to be at a boundary of two WLANs, determining whether to enable or disable WLAN using hysteresis.

In one alternative, the determining whether to enable or disable WLAN using hysteresis may be based on at least one of adjustable Received Signal Strength Indicator (RSSI)

threshold information, adjustable Reference Signal Received Power (RSRP) threshold information, adjustable Reference Signal Received Quality (RSRQ) threshold information or adjustable Timing Advance (TA) threshold information, each of the threshold information including a first threshold for transition from WLAN enablement to disablement and a second threshold for transition from WLAN disablement to enablement.

In one alternative, the method may include controlling, by the processing device, when the client device is determined to be at a given location associated with a WLAN identified by a given BSSID as indicated in the memory and a determination is that access attempts to the WLAN identified by the given BSSID are not successful over a time period N for over M visits to the given location, removing the association between the given location and the WLAN identified by the given BSSID indicated in the memory.

In one alternative, the method may include controlling, by the processing device, receiving an indication from a user of the client device confirming, declining or editing the association between the given location and the WLAN identified by the given BSSID, when the association between the given location and the WLAN identified by the given BSSID is removed from the memory.

In one alternative, N and M may be settable by a user of the client device and may be at respective default values when not set by the user.

In one alternative, the method may include controlling, by the processing device, operation in an automatic WLAN enablement control mode which uses WLAN and WWAN association information from the memory and a manual WLAN enablement control mode, based on input information from a user of the client device.

In one alternative, the method may include controlling, by the processing device, when the memory indicates a given association between a WLAN identified by a given BSSID and a WWAN identified by a given BSID, enabling at least one location determination process to determine a first location for the WLAN identified by the given BSSID which is more accurate than a second location for the WLAN identified by the given BSSID indicated by the given association, and when the second location is within a predetermined radius of the first location, enabling WLAN access for the WLAN identified by the given BSSID.

In one alternative, the method may include controlling, by the processing device, whether to enable or disable WLAN access for a WLAN identified by a given BSSID associated with a WWAN identified by a given BSID indicated in the memory, based on first location information other than second location information, in which the second location information includes at least one of a location for the WLAN identified by the given BSSID indicated in association information therefor in the memory or a location generated using WWAN derived information for the given BSID, wherein the WWAN derived information for the given BSID includes at least one of Reference Signal Received Power (RSRP), Reference Signal Received Quality (RSRQ) or Timing Advance (TA) information for the WWAN identified by the given BSID.

In accordance with an aspect of the present disclosure, an apparatus for internet access at a client device in a wireless communication system may include circuitry configured to control, when the client device is determined to be successfully connected to the internet via a Wireless Local Area Network (WLAN) identified by a new Basic Service Set Identifier (BSSID), storing in a memory of the client device an association of the new BSSID with a Base Station Identifier (BSID) identifying a Wireless Wide Area Network (WWAN) detected by the client device and a location of the client device at a time the client device is successfully connected to the internet via the WLAN identified by the new BSSID.

In accordance with an aspect of the present disclosure, a wireless communication device may include a receiver to receive a signal of a wireless communication system; and a processing device configured to control internet access at the wireless communication device. The processing device may be configured to control, when the wireless communication device is determined to be successfully connected to the internet via a Wireless Local Area Network (WLAN) identified by a new Basic Service Set Identifier (BSSID), storing in a memory of the wireless communication device an association of the new BSSID with a Base Station Identifier (BSID) identifying a Wireless Wide Area Network (WWAN) detected by the wireless communication device and a location of the wireless communication device at a time the wireless communication device is successfully connected to the internet via the WLAN identified by the new BSSID.

DETAILED DESCRIPTION

The foregoing aspects, features and advantages of the present disclosure will be further appreciated when considered with reference to the following description of exemplary embodiments and accompanying drawings, wherein like reference numerals represent like elements. In describing the exemplary embodiments of the disclosure illustrated in the appended drawings, specific terminology will be used for the sake of clarity. However, the disclosure is not intended to be limited to the specific terms used.

A Basic Service Set Identifier (BSSID) is an identifier consisting of up to 32 bytes used for uniquely identifying different Access Points of WLANs. Whenever a client terminal finds a WLAN with new BSSID, that information may be presented to the user. If the user has the access privileges for that particular WLAN, the access information such as username and/or password may be provided by the user. Once this information is provided by the user, the client terminal may save this information for future use.

Many modern client terminals include the capability to determine their location. There are various technologies used in client terminals and communication networks to determine the location. These technologies include but not limited to the following: Global Positioning System (GPS), Assisted GPS (AGPS), Enhanced Forward Link Trilateration (EFLT), Advanced Forward Link Trilateration (AFLT), Angle of Arrival (AOA), Observed Time Difference of Arrival (OTDOA), Enhanced Observed Time Difference of Arrival (EOTDOA), Base Station Identifier (BSID), Base Station Identifier combined with Timing Advance (TA), Base Station Identifier with TA and Received Signal Strength Indicator (RSSI), etc. Some of the above mentioned location technologies are client terminal based and some are network based. Some WWANs may deploy hybrid location technologies to improve the client terminal location determination. The accuracy of the location information may vary widely from one technology to another. For example, a client terminal that uses GPS receiver or an AGPS receiver to determine the location may have the location information with an accuracy of a few meters. For example, a client terminal that uses BSID of a cell to determine the location may have the location identified with an accuracy of a generally few hundred meters in densely populated areas such as residential and office areas and a few kilometers in rural areas.

A client terminal may periodically make measurements on all the cells that are detectable from its current location. The measurements may include RSSI measurements or other types of measurements depending on a particular WWAN. For example, in case of $3^{rd}$ Generation Partnership Project (3GPP) Long Term Evolution (LTE) WWAN, Reference Signal Received Power (RSRP) and Reference Signal Received Quality (RSRQ) are measured by a client terminal to make cell reselection decisions. These measurements are made regardless of whether the client terminal is in active connection or not. Therefore, at any given time, a client terminal may be associated with at least one cell and may have the BSID information of that cell in a WWAN.

During normal usage, a user is expected to input information into the client terminal such as the BSSID and security details of the WLANs to be used. According to an aspect of the present disclosure, whenever a client terminal successfully finds a new WLAN BSSID and connects to it for internet access, it may make an association of that particular WLAN BSSID with the BSID of a WWAN cell and the location of the client terminal at the time of successful WLAN access. According to an aspect of the present disclosure, the BSID of a WWAN cell may include one or more of the identifiers used for a base station. For example, in case of 3GPP LTE wireless communication system, the Physical Cell Identity (PCI) may be used or the Cell Global Identity (CGI) may be used or the combination of PCI and CGI may be used. In case of 3GPP LTE wireless communication system, the PCI may be unique only in a small geographic region whereas the CGI may be globally unique.

Figure 2:
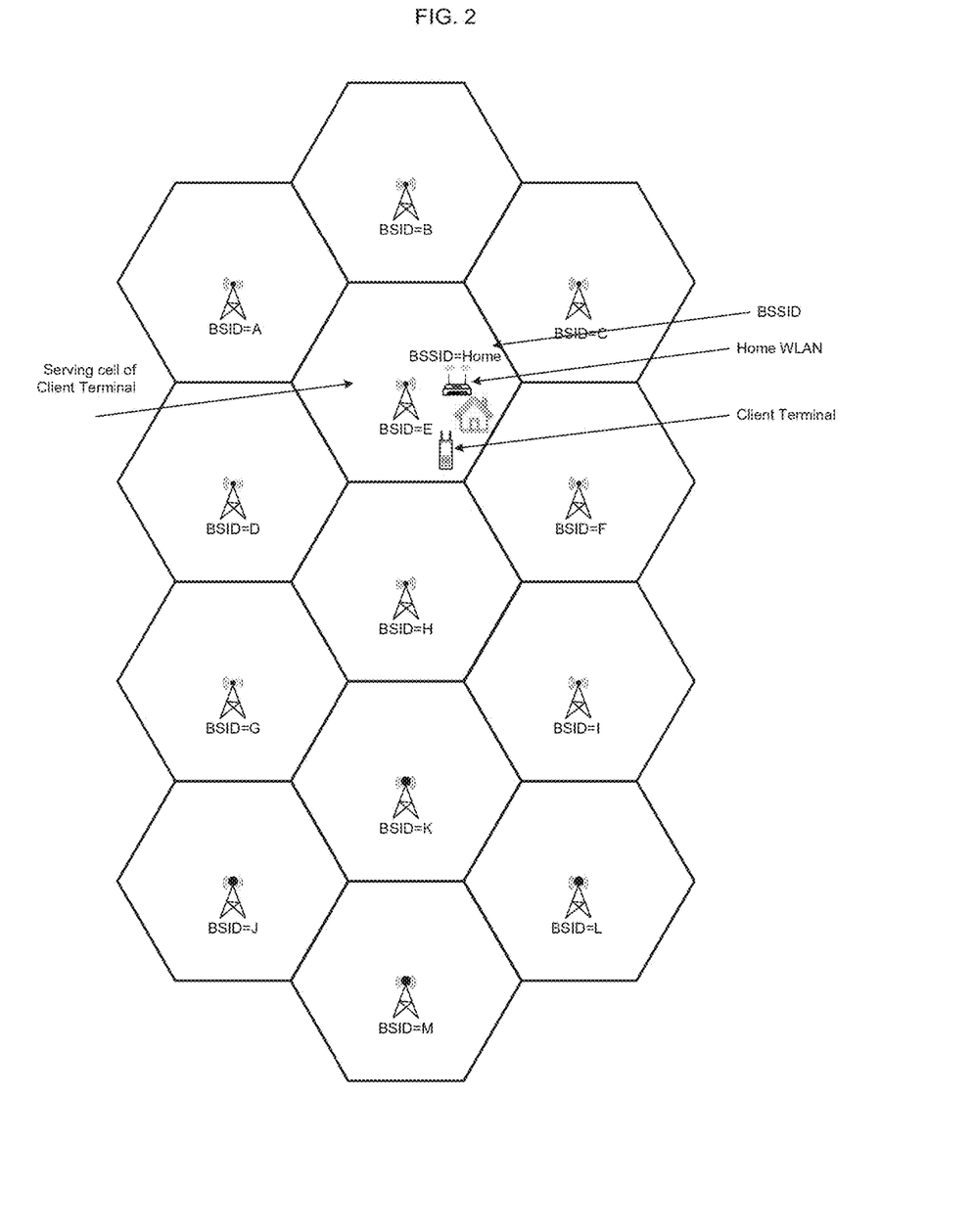
FIG. 2 illustrates an example internet usage scenario when a user has internet access available from both a WLAN and a WWAN.
Figure 3:
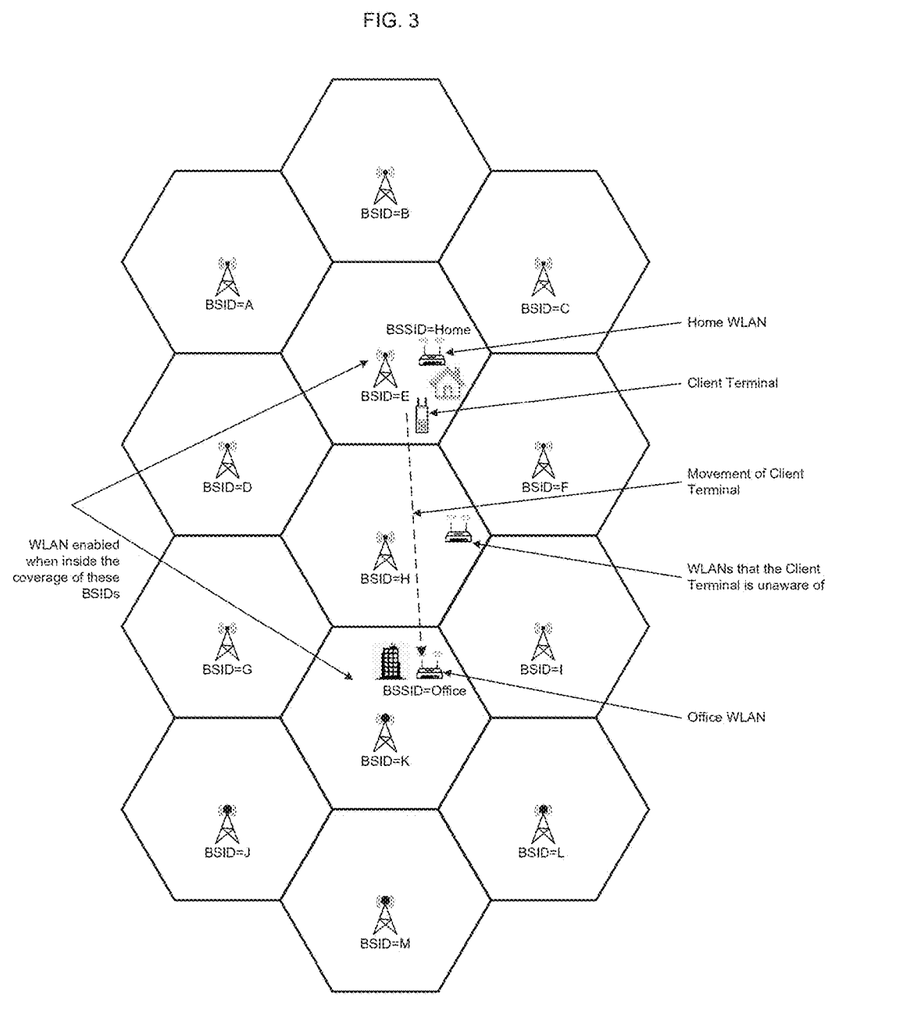
FIG. 3 illustrates an example scenario for association of Base Station Identifier (BSID) of a cell in a WWAN with Basic Service Set Identifier (BSSID) of a WLAN.

According to an aspect of the present disclosure, whenever a client terminal is within certain configurable radius of the location to which one or more successful WLAN BSSIDs were associated earlier, it may automatically enable the WLAN access for those specific WLAN BSSIDs. For example, when a user approaches home, the client terminal may be in the coverage area of the base station to which the home WLAN BSSID is associated as shown in FIG. 2 where the base station with BSID=E is providing coverage to the user's home area. The client terminal looks up its internal memory to check which, if any, WLAN BSSIDs are associated with the BSID=E. In the example shown in FIG. 2, the WLAN BSSID=Home is associated with BSID=E. According to another aspect of the present disclosure, when a client terminal detects the cell of WWAN with BSID=E, it may enable the WLAN for checking service availability from BSSID=Home if the client terminal is within the configurable radius of the location at which it may have received service from the same BSSID. The location of the client terminal may be determined at the time of the service availability from a WLAN such as the one with BSSID=Home. A client terminal may determine its location based on, for example, a Global Positioning System (GPS) receiver, or based on Observed time Difference of Arrival (OTDOA), or any other system based on triangulation, trilateration, etc. Furthermore, a client terminal may only enable the location determination subsystem if it finds that for its current WWAN BSID there is an associated WLAN BSSID. This ensures that the location determination subsystem may be enabled only for a short duration of time. Similarly, as shown in FIG. 3, when a user approaches an office, the client terminal may be in the coverage area of the base station to which the office WLAN BSSID is associated. When a client terminal detects the cell of WWAN with BSID=K, it may enable the WLAN for BSSID="Office" to get the internet access since the WLAN with BSSID=Office is associated with that BSID if the client terminal is within the configurable radius of the location at which it may have received service from the same BSSID. The location of the client terminal may be determined at the time of the service availability from a WLAN such as the one with BSSID=Office.

According to another aspect of the present disclosure, a client terminal may enable or disable WLAN access based on the associations between BSIDs and BSSIDs.

According to another aspect of the present disclosure when a client terminal moves out of the coverage area of the WWAN base station to which the current WLAN BSSID is associated, it may check whether the BSID of the new WWAN base station towards which it is moving in has any WLAN BSSIDs associated to it. If the BSID of the new base station is associated with any previously successful WLAN BSSIDs, the client terminal may continue to keep the WLAN access enabled for those specific WLAN BSSIDs. If the BSID of the new base station is not associated with any previously successful WLAN BSSIDs, the client terminal may disable the WLAN access. For example, as shown in FIG. 3, when the client terminal moves out of coverage area of base station with BSID=E and enters the coverage area of base station with BSID=H, it may enable search for any WLAN BSSID for a configurable duration of time. If it cannot find an accessible WLAN BSSID in that BSID after the configured amount of time, it may disable the WLAN access to reduce power consumption. According to an aspect of the present disclosure, if a WLAN BSSID is detected but not accessible to a user, e.g., because user may not be authorized to access that particular WLAN BSSID, then that particular WLAN BSSID may not be associated with a BSID.

Generally the coverage area of a base station of a WWAN may be much larger than the coverage area of a WLAN. According to another aspect of the disclosure, if a client terminal goes out of the coverage area of the WLAN, to reduce power consumption, it may disable WLAN access even before the client terminal goes out of the coverage area of the base station to which the WLAN BSSID is associated. The decision may be based on other available measurements such as more accurate location information, the RSSI, RSRP, RSRQ, TA, etc. According to another aspect of the present disclosure, the decision to enable or disable WLAN access may be based on additional criteria such as client terminal cell reselection or handover pattern. For example, when a user is going from Home to Office as illustrated in FIG. 3, it may enter the BSID=K only after having passed through the coverage area of BSID=H. Therefore, the decision to enable WLAN may be based on a sequence of cell selection or handover from BSID=E to BSID=K. According to another aspect of the present disclosure, the WLAN enablement and disablement may employ hysteresis to avoid switching on and off the WLAN when a client terminal is at the boundary of two cells. For example, in FIG. 3, when a user is transitioning from the coverage of BSID=E to the coverage of BSID=K, there may be frequent cell reselections or handovers. The hysteresis effect may be achieved using different methods. For example, a timer may be used to track how long a client terminal is staying in the coverage of the same BSID. If the client terminal is in the coverage of the same BSID for a configurable period of time, only then any decision regarding enablement or disablement of WLAN may be made. According to another aspect of the disclosure, the timer duration for hysteresis may be different for transition from WLAN enablement to disablement and the timer for transition from WLAN disablement to enablement.

According to another aspect of the present disclosure, the association of a BSSID to BSID may be one-to-one or it may be one-to-many. For example, when a WLAN AP is located at a boundary between two or more WWAN cells, the BSSID of the WLAN AP may be associated with the BSID of the two or more WWAN cells.

Figure 4:
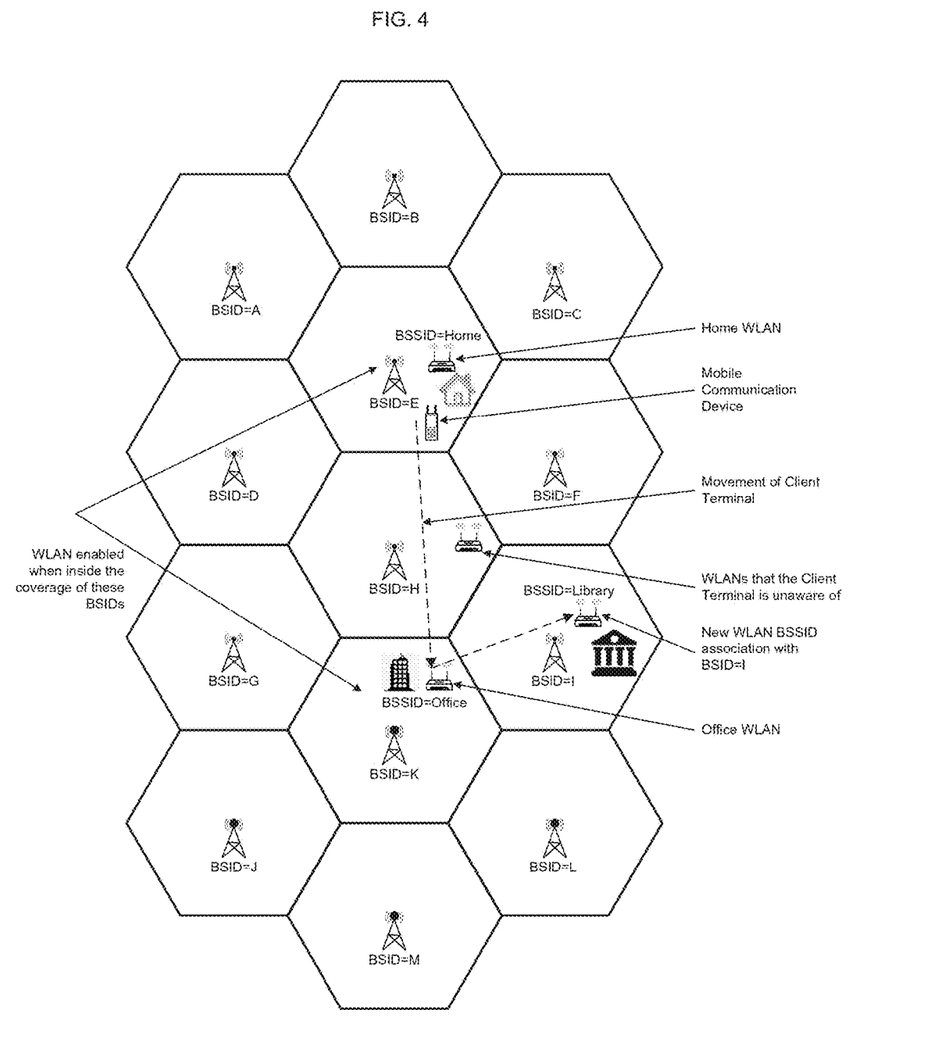
FIG. 4 illustrates an example scenario for association of BSID of a cell in a WWAN with BSSID of a WLAN.

According to another aspect of the present disclosure, a user may continue to add more WLAN BSSIDs as and when the user visits new areas where there is WLAN access available. For example, as shown in FIG. 4, when a user visits a library, which is located in the coverage area of base station with BSID=I for the first time, the WLAN of the library may be accessed on the client terminal by the user first providing the access information for the library WLAN. Once this information is entered in the client terminal, it makes the association of the library WLAN BSSID=Library with the WWAN BSID=I. During any subsequent visit to the library the client terminal may automatically enable WLAN access for BSSID=Library when it is within certain configurable radius of the WWAN BSID=I.

The method and apparatus disclosed in the present disclosure enable a client terminal to automatically turn on the WLAN access for the specific WLAN BSSIDs only when it is known or highly probable that there is a WLAN access available and turns off the WLAN access when it is unlikely to have WLAN access available. This method offers internet connection to the user continuously while reducing power consumption and offering best tradeoff amongst QoS, cost, availability, etc. without requiring user intervention. According to an aspect of the present disclosure, a client terminal may provide a user an interface for configuring the priority of various aspects such as power consumption, QoS, cost, etc.

According to an aspect of the present disclosure, the association of the location of the client terminal and the WLAN may take many different forms. For example, BSID to BSSID association or GPS coordinates to BSSID association. Alternatively, BSID to the WLAN Access Point Media Access Control (MAC) address association or GPS coordinates to the WLAN AP MAC address association. The particular method of association is not limited to the example methods mentioned above. According to an aspect of the present disclosure, multiple BSSIDs may be associated with a single location. For example, for a particular BSID, there may be three BSSIDs from which a client terminal may be able to get service. For that particular BSID, there may be three entries in the BSSID association. If multiple BSSIDs are associated with a BSID, the selection amongst them may be according to conventional selection techniques or the selection may be based on the priority configured by the user.

According to an aspect of the present disclosure, if the number of entries in the database of BSSID association with a location, such as BSID, exceeds the available memory, a client terminal may replace oldest entries in the database to create room for newer entries. The removal of older entries may be based on timestamps which may be stored along with BSSID information. Alternatively, the removal of older entries may be based on use of a circular buffer where new entries are added to the memory by using circular addressing such that when the end of the allocated memory is reached, new entries are written at the beginning of the allocated memory. This may overwrite and effectively remove previously stored entries in that location. When using circular buffering, the BSSID of a WLAN that is already in the database may be refreshed by placing its BSSID at the write address for the newest entry.

In case the location of a client terminal is associated with one or more WLAN BSSIDs and the particular WLAN is not detected even though it is enabled, the client terminal may perform periodic retries. Furthermore, the retry attempts may be separated in time according to an exponentially increasing interval. After certain number of configurable retry attempts, the WLAN access may be disabled for that particular BSSID to reduce power consumption.

According to another aspect of the present disclosure, the client terminal may calibrate the base station RSSI, RSRP, or RSRQ at which a WLAN with particular BSSID that is associated with the present BSID becomes detectable. Based on success and failure of WLAN access over a period of time for the WLAN for the particular BSSID associated with a location, the RSSI, RSRP, or RSRQ threshold at which the WLAN for the particular BSSID is enabled or disabled may be adjusted adaptively by the client terminal. According to another aspect of the present disclosure, the RSSI, RSRP, or RSRQ thresholds may be stored separately for each BSID to which a BSSID may be associated.

According to another aspect of the present disclosure, a client terminal may calibrate the TA at which a WLAN with particular BSSID that is associated with the present BSID becomes detectable. Based on success and failure of WLAN access over a period of time for the WLAN for the particular BSSID associated with a location, the TA threshold at which the WLAN for the particular BSSID is enabled or disabled may be adjusted adaptively by the client terminal. According to another aspect of the present disclosure, the TA thresholds may be stored separately for each BSID to which a BSSID may be associated.

According to another aspect of the present disclosure, the WLAN enablement and disablement may employ hysteresis to avoid switching on and off the WLAN when a client terminal is at the boundary of two cells. For example, when using RSSI, RSRP, RSRQ or TA thresholds for controlling the enablement and disablement of WLAN, configurable offsets, which the RSSI, RSRP, RSRQ or TA need to exceed, in order to make any decision regarding WLAN enablement or disablement. According to another aspect of the disclosure, the configurable offsets for hysteresis may be different for transition from WLAN enablement to disablement and the offsets for transition from WLAN disablement to enablement.

According to another aspect of the present disclosure, if a client terminal is in a location for which there is a WLAN associated and the WLAN access attempts are not successful over a period of N minutes of time over M number of visits to that location, the client terminal may remove the association between that particular location and the WLAN BSSID. For example, N may be 15 minutes and M may be five visits. According to an aspect of the present disclosure, when such association is removed, the client terminal may prompt the user to confirm, decline, or edit the associated WLAN settings. According to an aspect of the present disclosure, the parameters N and M may be user configurable and may have default values.

According to another aspect of the present disclosure, a client terminal may prompt the user to select between automatic WLAN enablement control and manual control. In addition to this, other settings may be configured when client terminal is powered up. For example, whether to prompt the user for removing an association between physical location and WLAN BSSID may be configured at initial power up or at any other time in the client terminal settings menu. The values of various configurable parameters as per the aspects of the present disclosure may be configured in the client terminal settings menu.

The location determination subsystems in a client terminal may not be normally enabled by default in most terminals due to increased power consumption. Therefore, the location technology subsystems are also turned on or off on a need basis by the user. According to another aspect of the present disclosure, the client terminal may first use the BSID to determine whether there is any WLAN associated with it. Then, if a WLAN BSSID is associated with the BSID, the client terminal may enable one of the available location determination subsystems to determine the location more accurately than what is achievable with BSID alone. If the WLAN BSSID is within certain radius of the accurate location obtained from the location determination subsystem, then the WLAN access for the particular BSSID may be enabled. This method allows the client terminal to control the WLAN access on a more finer granularity such that the WLAN access for the particular BSSID is enabled only when there is a very high probability of actually successfully getting the WLAN access. The more accurate location obtained from location subsystem may be further combined with RSSI, RSRP, RSRQ and TA of the BSID to make finer control of the WLAN access enablement and disablement.

According to another aspect of the disclosure the WLAN access enablement and disablement may be controlled based on the location information obtained from the location determination subsystem independent of the BSID or any other WWAN derived information such as BSID, TA, RSSI, RSRP, RSRQ, etc.

By way of example only, the above-described method may be implemented in a receiver, e.g., a user device such as a wireless client terminal 12 as shown in FIG. 1.

Figure 5:
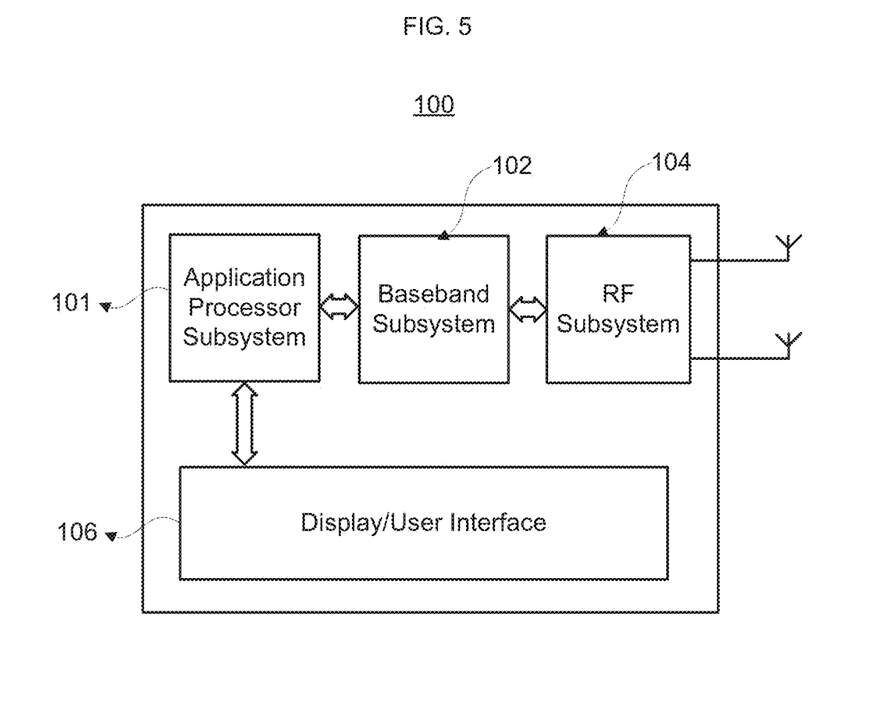
FIG. 5 illustrates a client terminal block diagram, which may be employed with aspects of the disclosure described herein.

As shown in FIG. 5, client terminal 100 may include an application processor subsystem 101, baseband subsystem 102 and a radio frequency (RF) subsystem 104 for use with a wireless communication network. A display/user interface 106 provides information to and receives input from the user. By way of example, the user interface may include one or more actuators, a speaker and a microphone. In some client terminals, certain combination of the application processor subsystem 101, the baseband subsystem 102 and the RF subsystem 104 are all integrated as one integrated chip.

Figure 6:
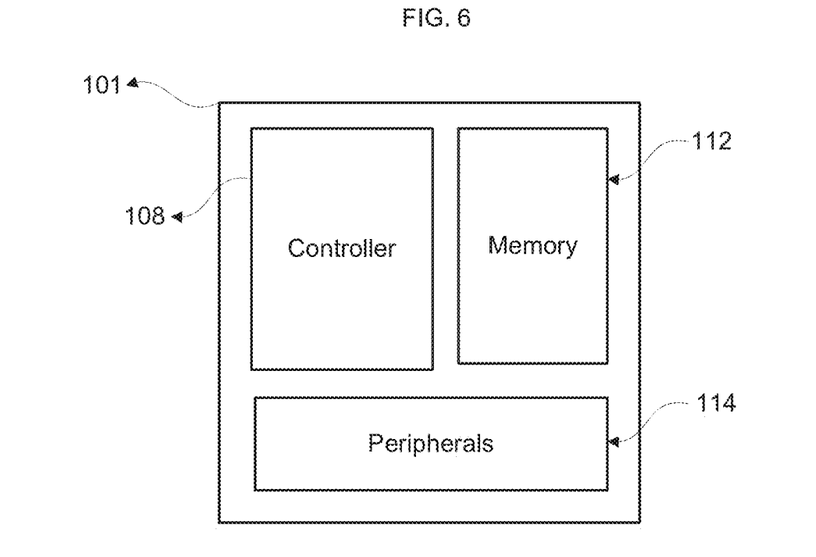
FIG. 6 illustrates an application processor subsystem for a wireless client terminal, which may be employed with aspects of the disclosure described herein.
Figure 7:
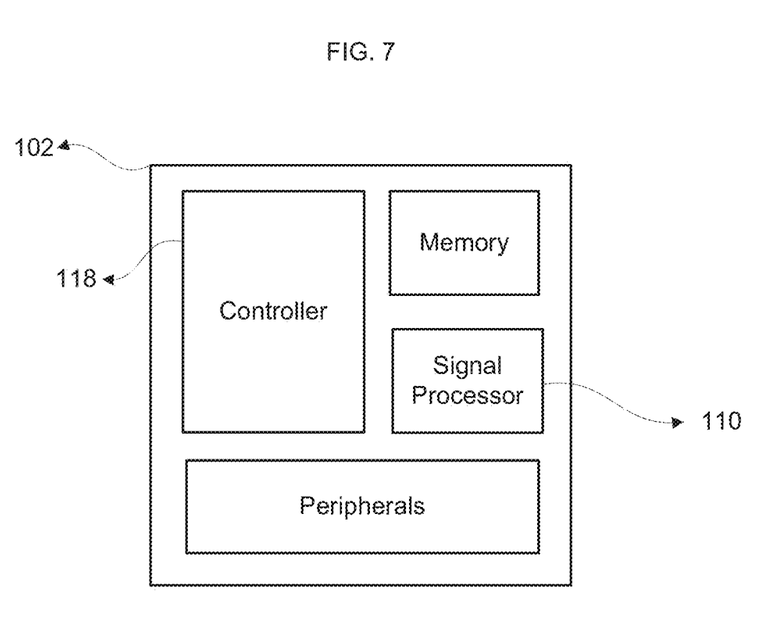
FIG. 7 illustrates a baseband subsystem for a wireless client terminal, which may be employed with aspects of the disclosure described herein.
Figure 8:
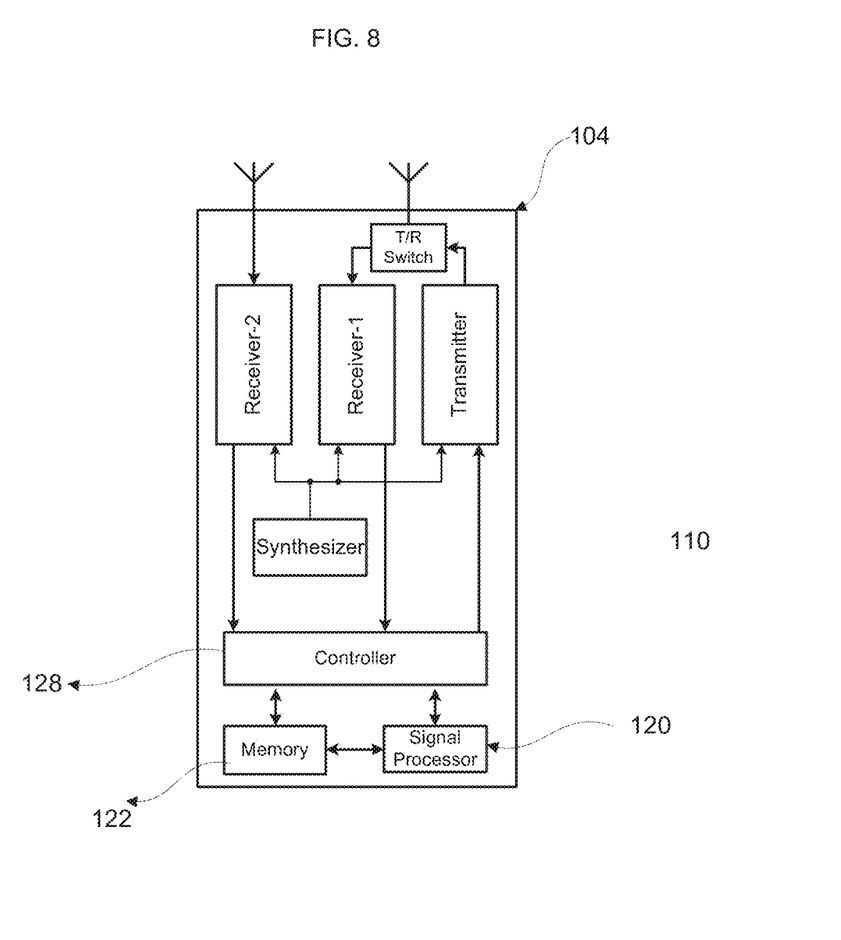
FIG. 8 illustrates a Radio Frequency (RF) subsystem for a wireless client terminal, which may be employed with aspects of the disclosure described herein.

The application processor subsystem 101 as shown in FIG. 6 may include a controller 108 such as a microcontroller, another processor or other circuitry. The baseband subsystem 102 as shown in FIG. 7 may include a controller 118 such as a microcontroller or other processor. The RF subsystem 104 as shown in FIG. 8 may include a controller 128 such as a microcontroller, another processor or other circuitry. The controller 108 desirably handles overall operation of the MS 100. This may be done by any combination of hardware, software and firmware running on the controller 108. Such a combination of hardware, software and firmware may embody any methods in accordance with aspects of the present disclosure.

Peripherals 114 such as a full or partial keyboard, video or still image display, audio interface, etc., may be employed and managed through the controller 108.

Aspects of the present disclosure may be implemented in firmware of the controller 108 of the application processor and/or the controller 118 of the baseband subsystem. In another alternative, aspects of the present disclosure may also be implemented as a combination of firmware and hardware of the application processor subsystem 101 and/or the baseband subsystem 102. For instance, a signal processing entity of any or all of the FIG. 7 may be implemented in firmware, hardware and/or software. It may be part of the baseband subsystem, the receiver subsystem or be associated with both subsystems. In one example, the controller 118 and/or the signal processor 110 may include or control the protocol entity circuitry. The software may reside in internal or external memory and any data may be stored in such memory. The hardware may be an application specific integrated circuit (ASIC), field programmable gate array (FPGA), discrete logic components or any combination of such devices. The terms controller and processor are used interchangeably herein.

The consumer electronics devices that may use the aspects of the disclosure may include smartphones, tablets, laptops, gaming consoles, cameras, video camcorders, TV, car entertainment systems, etc.

Although aspects of the disclosure herein have been described with reference to particular embodiments, it is to be understood that these embodiments are merely illustrative of the principles and applications of the aspects of the present disclosure. It is therefore to be understood that numerous modifications may be made to the illustrative embodiments and that other arrangements may be devised without departing from the spirit and scope of the aspects of the present disclosure as defined by the appended claims. Aspects of each embodiment may be employed in the other embodiments described herein.

The invention claimed is:

1. A method for internet access at a client device in a wireless communication system, the method comprising:
controlling, by a processing device, when the client device is determined to be successfully connected to the internet via a Wireless Local Area Network (WLAN) identified by a new Basic Service Set Identifier (BSSID), storing in a memory of the client device an association of the new BSSID with a Base Station Identifier (BSID) identifying a Wireless Wide Area Network (WWAN) detected by the client device and a location of the client device at a time the client device is successfully connected to the internet via the WLAN identified by the new BSSID; and controlling, by the processing device, when the client device is determined to move out of a coverage area of a WWAN identified by a given BSID to which a WLAN of a given BSSID is associated as indicated in the memory, and when the BSID identifying another WWAN to which the client device is moving is determined to be associated with at least one another BSSID as indicated in the memory, measuring a reference signal or timing advance associated with the BSID identifying the another WWAN, and when the reference signal or timing advance satisfies a threshold, maintaining WLAN access enabled at the client device for a WLAN identified by the at least one another BSSID, and when the BSID identifying another WWAN to which the client device is moving is determined not to be associated with any BSSID as indicated in the memory, disabling WLAN access at the client device.

2. The method of claim 1, wherein the BSID indicates at least one identifier for a base station.

3. The method of claim 2,
wherein the wireless communication system is a $3^{rd}$ Generation Partnership Project (3GPP) Long Term Evolution (LTE) wireless communication system, and
wherein the at least one identifier indicates a Physical Cell Identity (PCI) or a Cell Global Identity.

4. The method of claim 1, further comprising:
controlling, by the processing device, when the client device is determined to be within a predetermined radius of a given location to which at least one given BSSID is associated previously by the processing device as indicated in the memory, automatically enabling WLAN access at the client device for any of the at least one given BSSID.

5. The method of claim 1, further comprising:
controlling, by the processing device, when the WWAN identified by the BSID is detected at the client device and a current location of the client device is determined to be within a predetermined radius of the location, enabling checking whether internet service is available for the WLAN identified by the new BSSID.

6. The method of claim 5, wherein the processing device determines the current location of the client device when the detected WWAN identified by the BSID is determined to be associated with a WLAN identified by a given BSSID as indicated in the memory.

7. The method of claim 1, further comprising:
controlling, by the processing device, whether WLAN access is enabled at the client device based on a determination of an association between at least one second given BSID and at least one given BSSID as indicated in the memory.

8. The method of claim 1, further comprising:
controlling, by the processing device, enablement of WLAN access at the client device for the WLAN identified by the at least one another BSSID, based on whether the WLAN identified by the least one another BSSID is determined to be accessible to a user of the client device.

9. The method of claim 8, wherein the WLAN identified by the least one another BSSID is determined not to be accessible to user of the client device, when the user of the client device is not authorized to access the WLAN identified by the least one another BSSID.

10. The method of claim 1, further comprising:
controlling, by the processing device, operation in an automatic WLAN enablement control mode which uses WLAN and WWAN association information from the memory and a manual WLAN enablement control mode, based on input information from a user of the client device.

11. The method of claim 1, further comprising:
controlling, by the processing device,
when the memory indicates a given association between a WLAN identified by a second given BSSID and a WWAN identified by a second given BSID, enabling at least one location determination process to determine a first location for the WLAN identified by the second given BSSID which is more accurate than a second location for the WLAN identified by the second given BSSID indicated by the given association, and when the second location is within a predetermined radius of the first location, enabling WLAN access for the WLAN identified by the second given BSSID.

12. An apparatus for internet access at a client device in a wireless communication system, the apparatus comprising:
a processing device and a memory configured to store instructions which, when executed by the processing device, control:
when the client device is determined to be successfully connected to the internet via a Wireless Local Area Network (WLAN) identified by a new Basic Service Set Identifier (BSSID), storing in the memory an association of the new BSSID with a Base Station Identifier (BSID) identifying a Wireless Wide Area Network (WWAN) detected by the client device and a location of the client device at a time the client device is successfully connected to the internet via the WLAN identified by the new BSSID; and when the client device is determined to move out of a coverage area of a WWAN identified by a given BSID to which a WLAN of a given BSSID is associated as indicated in the memory, and when the BSID identifying another WWAN to which the client device is moving is determined to be associated with at least one another BSSID as indicated in the memory, measuring a reference signal or timing advance associated with the BSID identifying the another WWAN, and when the reference signal or timing advance satisfies a threshold, maintaining WLAN access enabled at the client device for a WLAN identified by the at least one another BSSID, and when the BSID identifying another WWAN to which the client device is moving is determined not to be associated with any BSSID as indicated in the memory, disabling WLAN access at the client device.

13. A wireless communication device comprising:
a receiver to receive at least a signal of a wireless communication system, whereby the signal provides the wireless communication device with internet access; and
a processing device configured to control internet access at the wireless communication device,
wherein the processing device is configured to control:
when the wireless communication device is determined to be successfully connected to the internet via a Wireless Local Area Network (WLAN) identified by a new Basic Service Set Identifier (BSSID), storing in a memory of the wireless communication device an association of the new BSSID with a Base Station Identifier (BSID) identifying a Wireless Wide Area Network (WWAN) detected by the wireless communication device and a location of the wireless communication device at a time the wireless communication device is successfully connected to the internet via the WLAN identified by the new BSSID; and when the wireless communication device is determined to move out of a coverage area of a WWAN identified by a given BSID to which a WLAN of a given BSSID is associated as indicated in the memory, and when the BSID identifying another WWAN to which the wireless communication device is moving is determined to be associated with at least one another BSSID as indicated in the memory, measuring a reference signal or timing advance associated with the BSID identifying the another WWAN, and when the reference signal or timing advance satisfies a threshold, maintaining WLAN access enabled at the wireless communication device for a WLAN identified by the at least one another BSSID, and when the BSID identifying another WWAN to which the wireless communication device is moving is determined not to be associated with any BSSID as indicated in the memory, disabling WLAN access at the wireless communication device.

* * * * *